(12) United States Patent
Cha et al.

(10) Patent No.: US 11,142,105 B2
(45) Date of Patent: Oct. 12, 2021

(54) VEHICLE WITH FLAT SEAT

(71) Applicants: Hyundai Motor Company, Seoul (KR); Kia Motors Corporation, Seoul (KR)

(72) Inventors: Dong Eun Cha, Hwaseong-si (KR); Jin Ho Hwang, Seoul (KR); Sang Heon Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 94 days.

(21) Appl. No.: 16/678,903

(22) Filed: Nov. 8, 2019

(65) Prior Publication Data

US 2020/0376988 A1 Dec. 3, 2020

(30) Foreign Application Priority Data

Jun. 3, 2019 (KR) .................. 10-2019-0065598

(51) Int. Cl.
| | |
|---|---|
| *B60N 2/30* | (2006.01) |
| *B60N 2/34* | (2006.01) |
| *B60N 2/90* | (2018.01) |
| *B60N 2/22* | (2006.01) |
| *B60N 2/75* | (2018.01) |

(Continued)

(52) U.S. Cl.
CPC ................ *B60N 2/34* (2013.01); *B60N 2/22* (2013.01); *B60N 2/995* (2018.02); *B60N 2/36* (2013.01); *B60N 2/77* (2018.02); *B60N 3/001* (2013.01); *B60N 3/008* (2013.01); *B60R 7/043* (2013.01); *B64D 11/0601* (2014.12); *B64D 2011/0069* (2013.01)

(58) Field of Classification Search
CPC ... B60N 2/34; B60N 2/77; B60N 2/56; B60N 2/36; B60N 3/001; B60N 3/008; B60N 2002/363; B60R 7/043; B64D 11/0627; B64D 11/0601; B64D 11/0639; B64D 11/0604; B64D 11/0641; B64D 2011/0069
See application file for complete search history.

(56) References Cited

U.S. PATENT DOCUMENTS

| | | | |
|---|---|---|---|
| 6,059,364 A * | 5/2000 | Dryburgh | A47C 1/0352 297/354.13 |
| 6,065,795 A | 5/2000 | Forster et al. | |

(Continued)

FOREIGN PATENT DOCUMENTS

| | | | |
|---|---|---|---|
| DE | 10 2007 052 727 A1 | 5/2009 | |
| DE | 10 2016 104 907 A1 | 10/2016 | |

(Continued)

OTHER PUBLICATIONS

Extended European Search Report dated Mar. 17, 2020 for European Patent Application No. 19208752.6.

*Primary Examiner* — Syed A Islam

(74) *Attorney, Agent, or Firm* — Morgan Lewis & Bockius LLP

(57) ABSTRACT

A vehicle with a flat seat may include a floor portion having a leg groove recessed downward from a surface of the floor portion; a seatback disposed on the floor portion and reclining by a rotation of the lower end; a seat cushion disposed on the floor portion ahead of the seatback; and a leg cushion disposed in the leg groove of the floor portion and having a rear portion rotatably coupled to the seat cushion.

18 Claims, 9 Drawing Sheets

(51) Int. Cl.
*B60N 2/36* (2006.01)
*B60R 7/04* (2006.01)
*B64D 11/06* (2006.01)
*B60N 3/00* (2006.01)
*B64D 11/00* (2006.01)

(56) References Cited

U.S. PATENT DOCUMENTS

| | | | |
|---|---|---|---|
| 9,272,667 B2* | 3/2016 | Smith | G05D 3/10 |
| 2008/0007091 A1 | 1/2008 | Lechkun et al. | |
| 2010/0007163 A1* | 1/2010 | Almeida | B60R 7/043 |
| | | | 296/37.8 |
| 2016/0288669 A1 | 10/2016 | Woodhouse et al. | |
| 2018/0265010 A1 | 9/2018 | Line et al. | |
| 2019/0260238 A1* | 8/2019 | Cho | B60N 2/5685 |
| 2020/0369390 A1* | 11/2020 | Galin | B64D 11/0691 |

FOREIGN PATENT DOCUMENTS

| | | |
|---|---|---|
| EP | 0 618 128 A1 | 10/1994 |
| JP | 2009-504510 A | 2/2009 |
| KR | 1999-0015700 U | 5/1999 |
| KR | 20-0357660 Y1 | 7/2004 |
| KR | 10-0590162 B1 | 6/2006 |
| KR | 10-2018-0108955 A | 10/2018 |

* cited by examiner

VEHICLE WITH FLAT SEAT

CROSS-REFERENCE TO RELATED APPLICATION

The present application claims priority to Korean Patent Application No. 10-2019-0065598, filed on Jun. 3, 2019, the entire contents of which is incorporated herein for all purposes by this reference.

BACKGROUND OF THE PRESENT INVENTION

Field of the Invention

The present invention, in the field of an automotive seat, relates to a vehicle with a flat seat that provides a flat space where a passenger can lie in a vehicle.

Description of Related Art

In general, vehicles are used as a means for conveyance or transportation. Vehicles are provided with seats that provide sitting spaces therein to transport passengers. Most seats provide a space where a user can lie by having a seatback which may be reclined. However, even if a seatback may be reclined to be level with a seat cushion, a passenger can lie only in a limited space. Furthermore, since there are leg cushion, etc., although the leg cushion supports the legs of a passenger, a completely flat space cannot be secured for the passenger, so that the passenger feels more tired in long-time driving.

Therefore, there is a demand for a new concept of vehicle for solving the present problem.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a vehicle with a flat seat that provides a flat space so that a passenger can lie in the vehicle in the field of automotive seat.

In various aspects of the present invention, a vehicle with a flat seat according to an exemplary embodiment of the present invention may include a floor portion having a leg groove recessed downward from a surface of the floor portion; a seatback disposed on the floor portion; a seat cushion disposed on the floor portion ahead of the seatback; and a leg cushion disposed in the leg groove of the floor portion, and configured for covering the leg groove to form a bottom together with the seat cushion and the floor portion when unfolded, and opening the leg groove when stowed.

A rear portion of the leg cushion may be rotatably coupled to the seat cushion, and when the leg cushion is rotated rearward thereof, the leg groove may be open or when the leg cushion is rotated upward, the leg cushion may form the bottom together with the seat cushion and the floor portion.

The vehicle may further include a sliding rail fixed to the floor portion, in which the seatback may be fastened to the sliding rail to be slid forward and rearward by operation of a first driving unit.

The leg cushion may be rotated upward or downward by operation of a second driving unit.

The vehicle may further include a controller configured for controlling the first driving unit such that the seatback slides forward and rearward or controlling the second driving unit such that the leg cushion is rotated upward or downward, in which, in a seat mode, the controller may make the seatback slide forward and the leg cushion rotate downward by controlling the first driving unit and the second driving unit, and in a sleep mode, the controller may make the seatback slide rearward and the leg cushion rotate upward by controlling the first driving unit and the second driving unit.

A first storage space recessed under the sliding rail may be formed in the floor portion, and the vehicle may further include a cover panel slidably disposed over the first storage space to selectively open the first storage space by sliding of the cover panel.

The cover panel may be covered with the seatback when the seatback slides forward and may be exposed when the seatback slides rearward thereof.

A plurality of seat units may be provided and disposed on the floor portion of the vehicle such that fronts of each pair of the seat units face each other.

The vehicle may further include a separation panel formed in the floor portion between seat units facing each other to separate the leg grooves.

The vehicle may further include an armrest panel disposed at a side of the seat cushion on the floor portion, and forming a step higher than the seat cushion by operation of a third driving motor or forming the bottom together with the seat cushion and the floor portion by operation of the third driving unit.

The vehicle may further include a table panel having a panel shape, disposed on a side of a door disposed at a side outward the seat unit, and being deployed over the seat cushion or the leg cushion by rotating by operation of a fourth driving unit.

The vehicle may further include a controller configured for controlling the fourth driving unit to rotate the table panel, in which the controller may be configured to control the fourth driving unit such that the table panel is deployed over the seat cushion or the leg cushion in a seat mode, and may control the fourth driving unit such that the table panel is not deployed over the seat cushion or the leg cushion.

A high-voltage battery may be disposed under the floor portion and the seat cushion may be connected to the high-voltage battery through a heat transfer unit.

The heat transfer unit may be a heat pipe.

A second storage space disposed under the seat cushion and recessed from a side of the floor portion to an interior of the vehicle may be formed in the floor portion.

The vehicle may further include a shoe panel disposed on a side of the floor portion, having a panel shape sliding into or out of the vehicle, and sliding out of the vehicle when a door is open and sliding into the vehicle when the door is closed.

According to the vehicle with a flat seat of the present invention, a flat space may be formed such that a passenger can lie in the interior of the vehicle.

Since the flat space has a complete horizontal plane, a passenger can conveniently move even in long-time driving.

The methods and apparatuses of the present invention have other features and advantages which will be apparent from or are set forth in more detail in the accompanying drawings, which are incorporated herein, and the following

Figure 1:
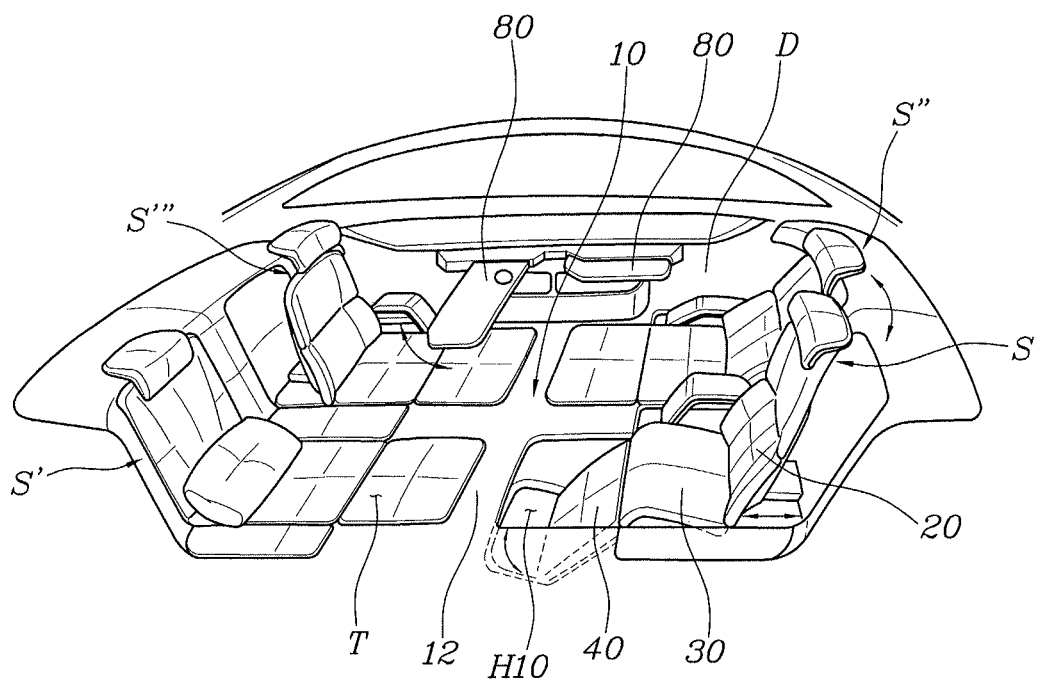
FIG. 1 is a view showing a vehicle with a flat seat according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 2:
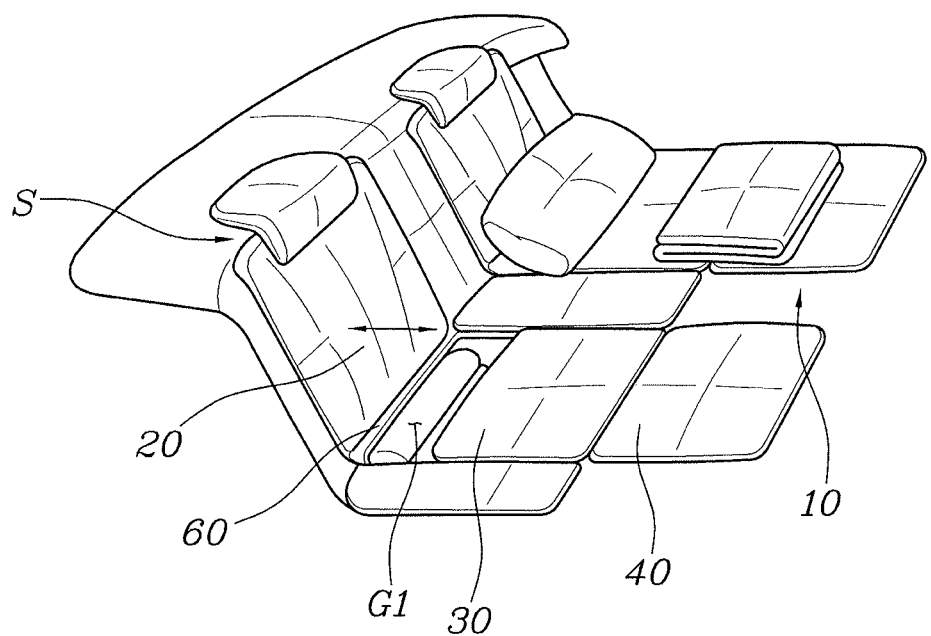
FIG. 2 is a view showing a sleep mode of the vehicle with a flat seat according to an exemplary embodiment of the present invention.
Figure 3:
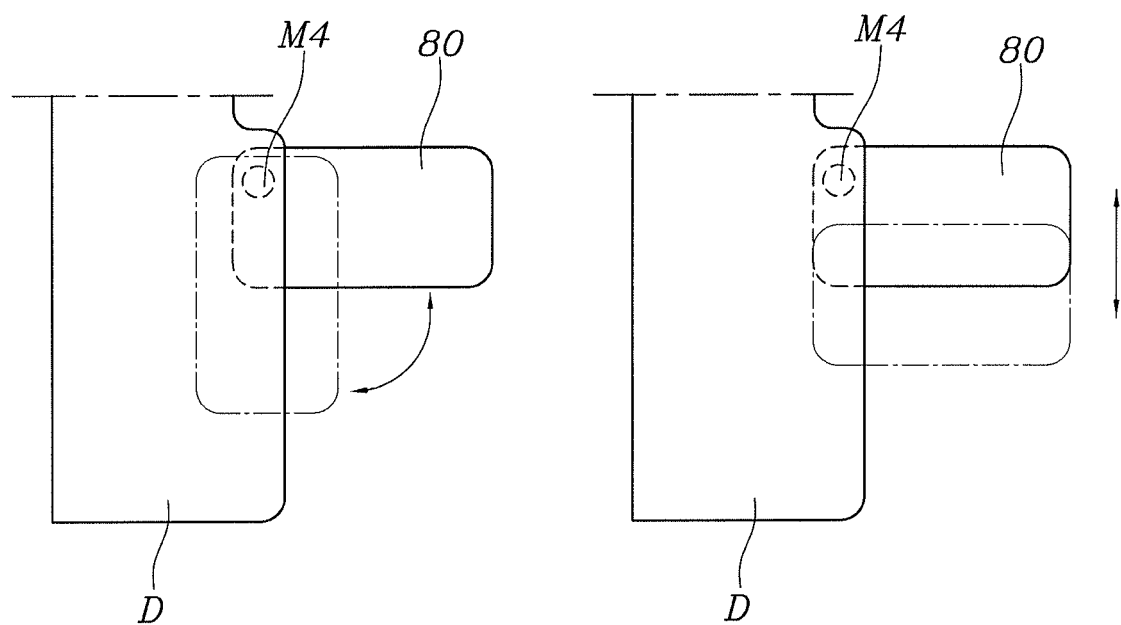
FIG. 3 is a view showing a table panel according to an exemplary embodiment of the present invention.
Figure 4:
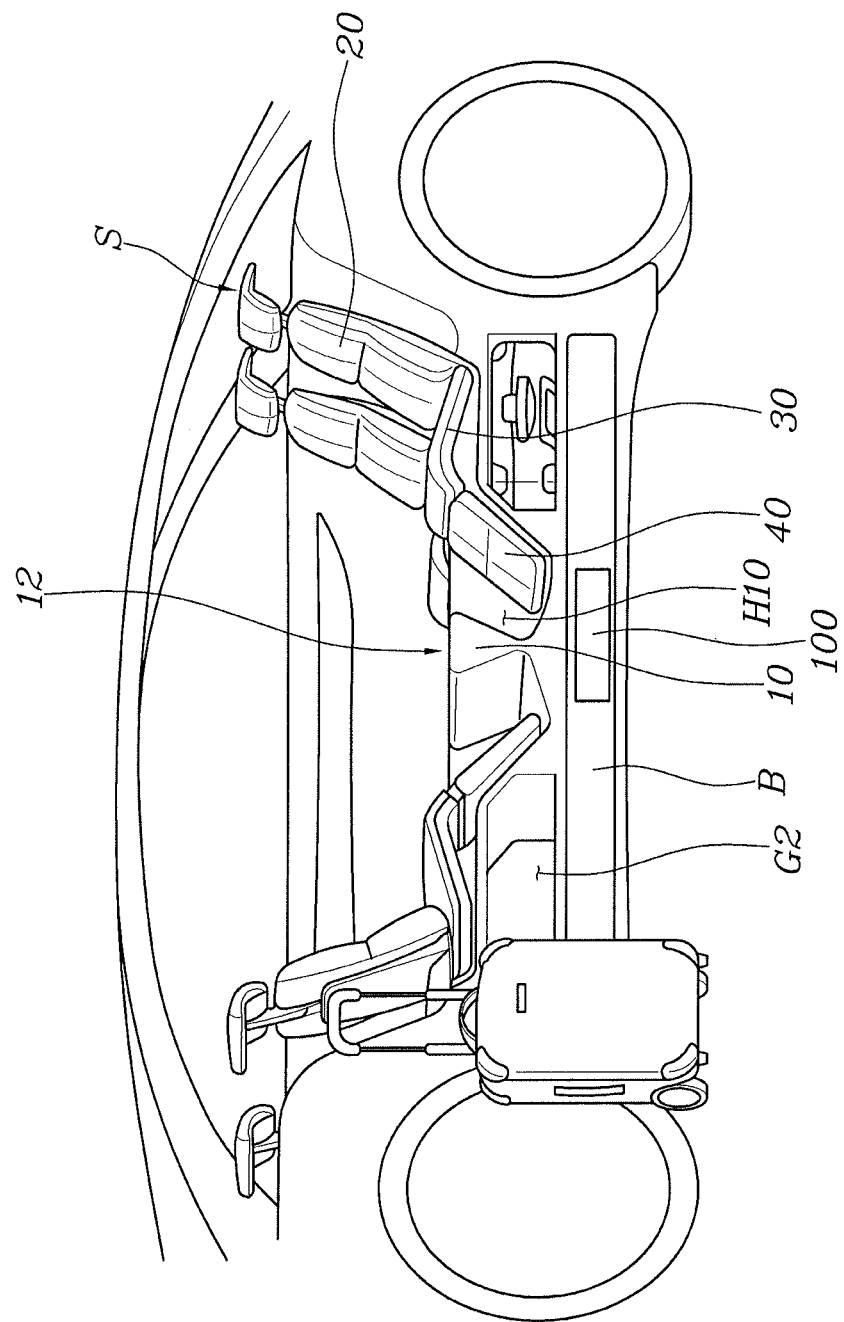
FIG. 4 is a view showing a first storage space according to an exemplary embodiment of the present invention.
Figure 5:
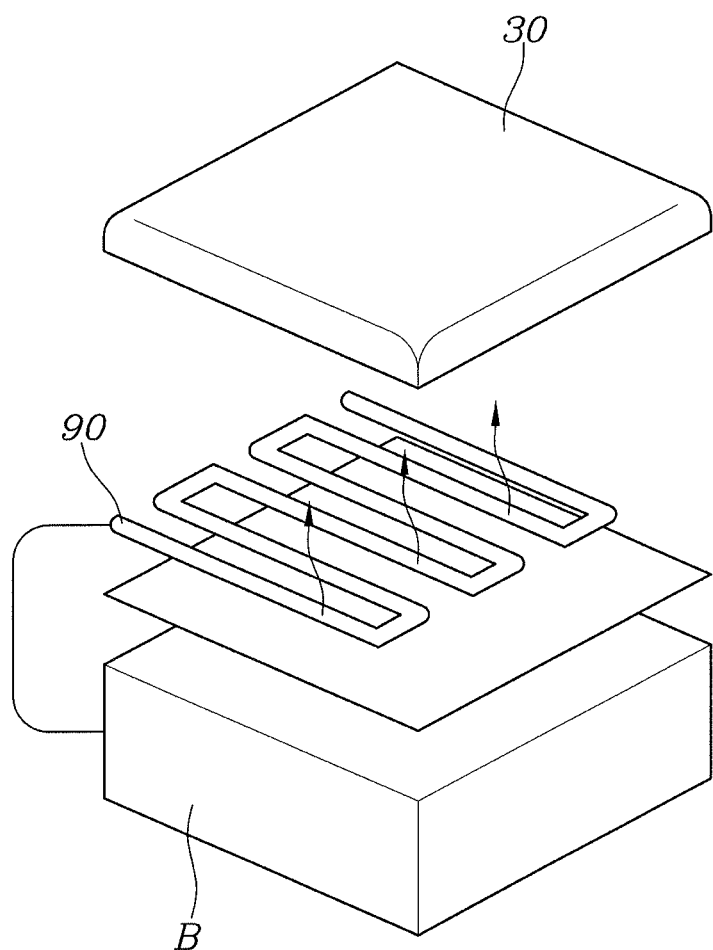
FIG. 5 is a view showing the state when a high-voltage battery is connected to the seat cushion according to an exemplary embodiment of the present invention.
Figure 6:
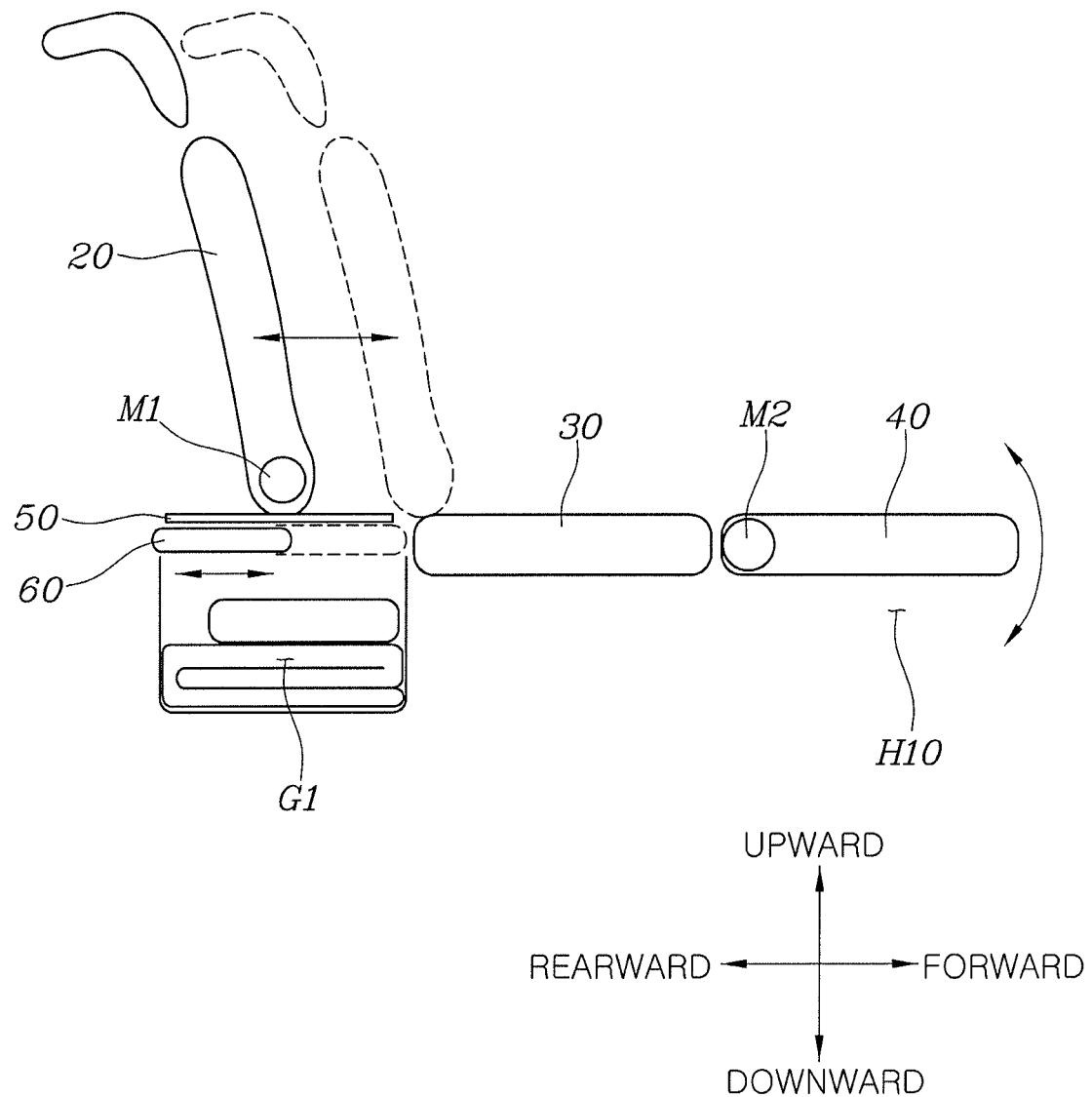
FIG. 6 is a view showing a seat unit according to an exemplary embodiment of the present invention.
Figure 7:
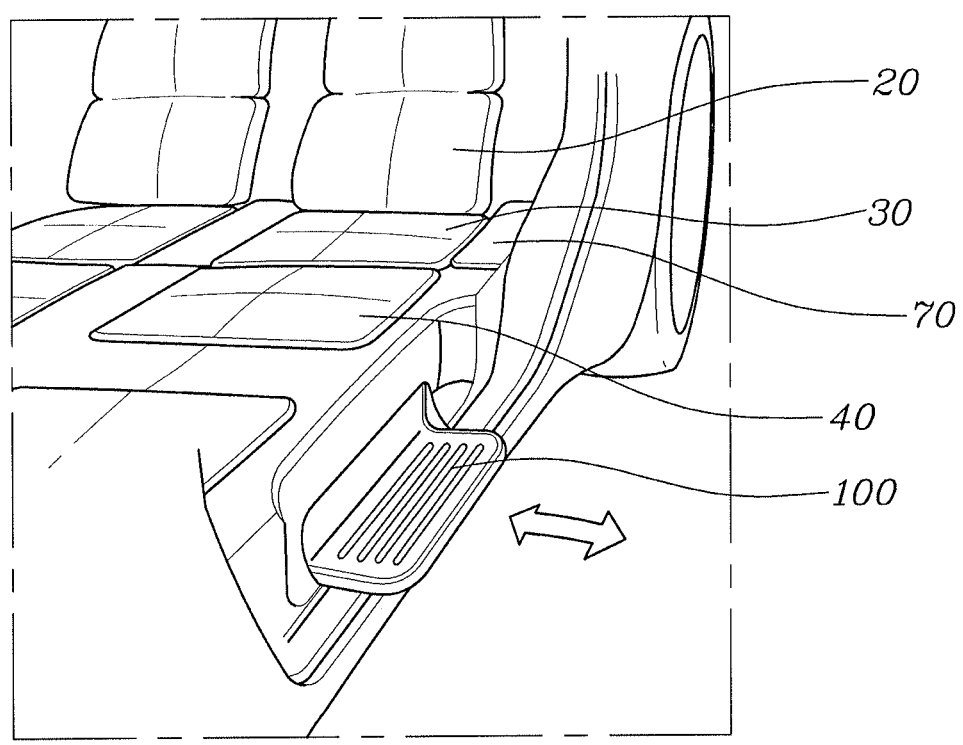
FIG. 7 is a view showing a shoe panel according to an exemplary embodiment of the present invention.
Figure 8:
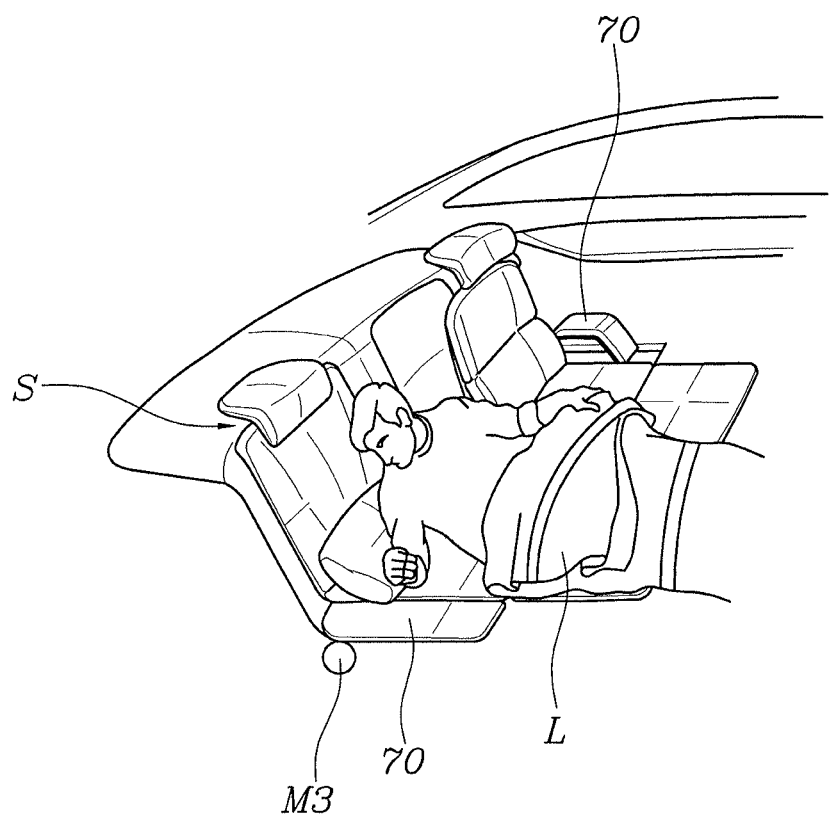
FIG. 8 is a view showing the sleep mode of the vehicle with a flat seat according to an exemplary embodiment of the present invention.
Figure 9:
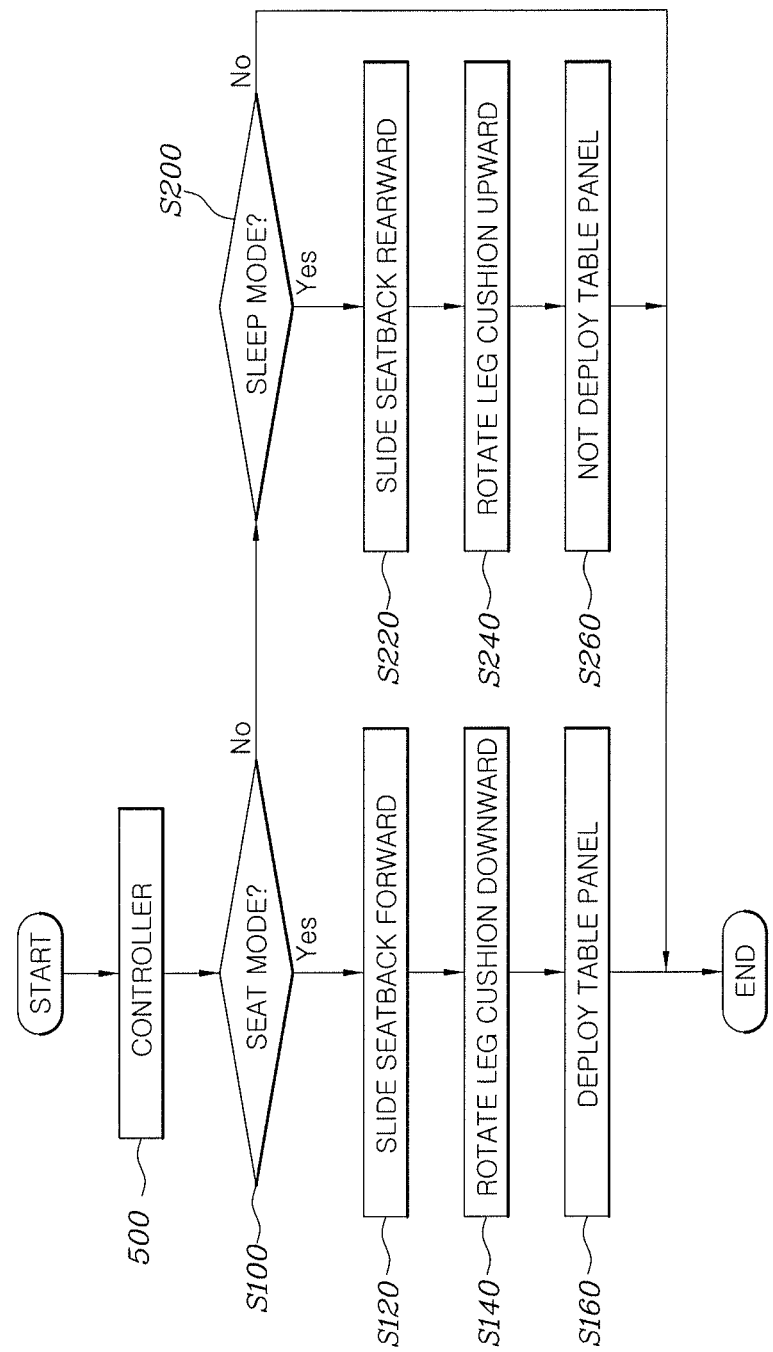
FIG. 9 is a view showing control of a seat mode and a sleep mode of the vehicle with a flat seat according to an exemplary embodiment of the present invention.

FIG. 1 is a view showing a vehicle with a flat seat according to an exemplary embodiment of the present invention, FIG. 2 is a view showing a sleep mode of the vehicle with a flat seat according to an exemplary embodiment of the present invention, FIG. 3 is a view showing a table panel according to an exemplary embodiment of the present invention, FIG. 4 is a view showing a first storage space according to an exemplary embodiment of the present invention, FIG. 5 is a view showing the state when a high-voltage battery is connected to the seat cushion according to an exemplary embodiment of the present invention, FIG. 6 is a view showing a seat unit according to an exemplary embodiment of the present invention, FIG. 7 is a view showing a shoe panel according to an exemplary embodiment of the present invention, FIG. 8 is a view showing the sleep mode of the vehicle with a flat seat according to an exemplary embodiment of the present invention, and FIG. 9 is a view showing control of a seat mode and a sleep mode of the vehicle with a flat seat according to an exemplary embodiment of the present invention.

FIG. 1 is a view showing a vehicle with a flat seat according to an exemplary embodiment of the present invention. A vehicle with a flat seat according to an exemplary embodiment of the present invention, as shown in FIG. 1, includes: a floor portion 10 having a leg groove H10 recessed downward; a seatback 20 disposed on the floor portion 10; a seat cushion 30 disposed on the floor portion 10 ahead of the seatback 20; and a leg cushion 40 disposed in the leg groove H10 of the floor portion 10, covering the leg groove H10 to form a bottom together with the seat cushion 30 and the floor portion 10 when unfolded, and opening the leg groove H1 when stowed.

The vehicle with a flat seat according to an exemplary embodiment of the present invention has the floor portion 10. The floor portion 10 forms the bottom portion of the interior of the vehicle. The leg groove H10 recessed downward is formed on the floor portion 10. Accordingly, the leg groove H10 provides a space in which a passenger can put his or her legs or lower body when sitting in the seat. Furthermore, according to an exemplary embodiment of the present invention, there are provided the seatback 20, the seat cushion 30, and the leg cushion 40. The seatback 20 may be reclined by rotating the lower end portion thereof. As shown in FIG. 6, the seat cushion 30 is disposed ahead of the seatback 20. The leg cushion 40 forms the bottom together with the seat cushion 30 and the floor portion 10 by closing the leg groove H10 when unfolded, and opens the leg groove H10 when stowed.

In more detail, the rear portion of the leg cushion 40 is rotatably coupled to the seat cushion 30, so when the leg cushion 40 is rotated rearward thereof, the leg groove H10 may be open or when the leg cushion 40 is rotated upward, the leg cushion 40 can form the bottom together with the seat cushion 30 and the floor portion 10.

In the specification, a set including the seatback 20, the seat cushion 30, and the leg cushion 40 is defined as a seat unit S.

Referring to FIG. 1, there is provided a plurality of seat units S, S', S", and A left seat unit S' and a right seat unit S are described hereafter. When the leg cushion 40 of the right seat unit S is rotated downward, the leg groove H10 is open. Accordingly, a passenger can sit in the seat with his or her legs or lower body in the leg groove H10. When the leg cushion 40 of the right seat unit S' is rotated upward, the leg groove H10 is closed, and the seat cushion 30 and the leg cushion 40 form the bottom together with the floor portion 10, whereby a flat space T is formed. In the instant case, a passenger can lie in the flat space when the flat space T is formed, the floor portion 10, the seat cushion 30, and the leg cushion 40 form the bottom, so a wide space in which a passenger can lie may be secured. According to existing vehicles, passengers sit or somewhat lie in limited spaces, so they feel more tired in long-time driving. However, according to an exemplary embodiment of the present invention, the flat space T that enables a passenger to lie not only on the seat cushion 30 and the leg cushion 40, but also on the floor portion 10 is formed. Accordingly, a passenger can more freely move, so that the passenger can conveniently move even in long-time driving.

FIG. 6 is a view showing a seat unit according to an exemplary embodiment of the present invention. The vehicle with a flat seat according to an exemplary embodiment of the present invention further includes a sliding rail 50 fixed in the floor portion 10 and the seatback 20 may be fastened to the sliding rail 50 to be slid forward and rearward by operation of a first driving unit M1. The sliding rail 50 is provided in an exemplary embodiment of the present invention. The seatback 20 is fastened to the sliding rail 50 and can slide forward and rearward thereof. In the instant case, the first driving unit M1 is provided, so that the seatback 20 may be slid by operation of the first driving unit M1. The first driving unit M1 may be a motor or may be implemented in other various ways that can slide the seatback 20. When the seatback 20 slides rearward thereof, a larger space in which a passenger can lie may be secured on the floor portion 10. When the seatback 20 slides forward, the seatback 20 comes close to the seat cushion 30, so that the seatback 20 can support the rear of a passenger sitting in the seat.

As shown in FIGS. 1 to 6, the leg cushion 40 may be rotated upward or downward by a rotation of the second driving unit M2. The second driving unit M2 may be a motor or may be implemented in other various ways that can rotate the leg cushion 40.

A controller 500 according to exemplary embodiments of the present invention may be implemented through a non-volatile memory configured to store algorithms for controlling operation of various components of a vehicle or data about software commands for executing the algorithms, and a processor configured to perform operation to be described below using the data stored in the memory. The memory and the processor may be individual chips. Alternatively, the memory and the processor may be integrated in a single chip. The processor may be implemented as one or more processors.

FIG. 9 is a view showing control of a seat mode and a sleep mode of the vehicle with a flat seat according to an exemplary embodiment of the present invention. As shown in FIGS. 1 to 9, the vehicle with a flat seat according to an exemplary embodiment of the present invention may further include a controller 500 that controls the first driving unit M1 such that the seatback 20 slides forward and rearward or controls the second driving unit M2 such that the leg cushion 40 is rotated upward or downward.

In a seat mode (S100), the controller 50 can make the seatback 20 slide forward (S120) and the leg cushion 40 rotate downward (S140) by controlling the first driving unit M1 and the second driving unit M2. Accordingly, when the seatback 20 slides forward and comes close to the seat cushion 30, the seatback 20 can support the rear of a passenger sitting in the seat. Furthermore, when the leg cushion 40 rotates downward and opens the leg groove H10, a passenger sitting in the seat can put his or her legs or lower body in the leg groove H10.

In a sleep mode (S200), the controller 50 can make the seatback 20 slide rearward (S220) and the leg cushion 40 rotate upward (S240) by controlling the first driving unit M1 and the second driving unit M2. Accordingly, as the seatback 20 slides rearward thereof, a larger space in which a passenger can lie may be secured. Furthermore, as the leg cushion 40 rotates upward, the leg groove H10 is closed and the leg cushion 40 forms the bottom together with the seat cushion 30 and the floor portion 10, so that the flat space T is formed and accordingly a space in which a passenger can lie is formed.

FIG. 2 is a view showing a sleep mode of the vehicle with a flat seat according to an exemplary embodiment of the present invention and FIG. 6 is a view showing a seat unit according to an exemplary embodiment of the present invention. The vehicle with a flat seat according to an exemplary embodiment of the present invention may have a first storage space G1 recessed under the sliding rail 50 in the floor portion 10 and may further include a cover panel 60 mounted over the first storage space G1 to open or close the first storage space G1 by sliding.

As shown in FIGS. 2 to 6, according to an exemplary embodiment of the present invention, a storage space G1 recessed under the sliding rail 50 is formed in the floor portion 10. Bedclothes or other objects may be stored in the first storage space G1. Meanwhile, the present invention may further include a cover panel 60 which is disposed over the first storage space G1 and opens or closes the first storage space G1 by sliding. The cover panel 60 may be disposed under the sliding rail 50 or in the floor portion 10. The cover panel 60 can open or close the first storage space G1 by sliding over the first storage space G1.

In more detail, the cover panel 60 may be covered with the seatback 20 when the seatback 20 slides forward and may be exposed when the seatback 20 slides rearward thereof. Referring to FIG. 2, the seatback 20 slides rearward thereof, the seatback 20 is spaced from the seat cushion 30, the cover panel 60 slides, and the first storage space G1 is open. Accordingly, a passenger can open the first storage space G1 by sliding the cover panel 60 toward the seatback 20, can put objects into the storage space G1, and then can close the first storage space G1 by sliding the cover panel 60 toward the seat cushion 30.

Furthermore, as shown in FIG. 1, a plurality of seat units is provided and may be disposed on the floor portion 10 of the vehicle such that the fronts of each pair of the seat units face each other. Referring to FIG. 1, a plurality of seat units may be provided on the floor portion 10 of the vehicle. The seat units may be disposed such that the fronts of each pair of the seat units face each other.

In more detail, the vehicle with a flat seat of the present invention may further include a separation panel 12 formed in the floor portion 10 between seat units facing each other to separate the leg grooves H10.

Since the separation panel 12 is formed in the floor portion 10, the leg grooves H10 of the seat units may be separated. Accordingly, the leg grooves H10 are defined as individual spaces, so passengers are prevented from hitting or interfering with each other with legs or lower bodies, so they can sit in more comfortable postures. Passengers can put their legs or lower bodies in the separate leg grooves H10, so convenience is improved.

FIG. 8 is a view showing the sleep mode of the vehicle with a flat seat according to an exemplary embodiment of the present invention. The vehicle with a flat seat according to an exemplary embodiment of the present invention may further include an armrest panel 70 which is disposed at a side of the seat cushion 30 on the floor portion 10, forms a step higher than the seat cushion 30 by operation of a third driving motor M3, or forms the bottom together with the seat cushion 30 and the floor portion 10 by operation of the third driving unit M3.

As shown in the figures, the armrest panel 70 formed at a side of the seat cushion 30 can form a step higher than the seat cushion 30 by operation of the third driving unit M3. A motor or other various ways may be applied for the third driving unit M3. The armrest panel 70 has a plurality of links, so that the armrest panel 70 can form a step by operation of the third driving unit M3. In FIG. 8, the armrest panel 70 at the upper portion has formed a step structure and the armrest panel 70 at the lower portion has formed the bottom together with the seat cushion 30 and the floor portion 10.

Since the armrest panel 70 is provided, a step on which a passenger sitting in the seat can put an arm is provided, so that the passenger can sit in more comfortable posture. When the armrest panel 70 forms the bottom together with the seat cushion 30 and the floor portion 10, a passenger can lie in a larger space in a more comfortable posture in the interior of the vehicle, so convenience is improved.

Bedclothes such as a comforter L having a seatbelt may be provided in an exemplary embodiment of the present invention, as shown in FIG. 8. Accordingly, even though a passenger lies in the vehicle, it is possible to secure safety through the seatbelt on the bedclothes such as the comforter.

FIG. 1 is a view showing a vehicle with a flat seat according to an exemplary embodiment of the present invention and FIG. 3 is a view showing a table panel 80 according to an exemplary embodiment of the present invention. The vehicle with a flat seat according to an exemplary embodiment of the present invention may further include a table panel 80 that has a panel shape, is disposed on a side of a door D disposed at a side outward the seat unit, and is positioned over the seat cushion 30 or the leg cushion 40 by rotating by operation of a fourth driving unit M4.

In FIG. 3, the solid line indicates the table panel 80 deployed over the seat cushion 30 or the leg cushion 40 and the dotted line indicates the table panel 80 not deployed over the seat cushion 30 or the leg cushion 40.

The table panel 80 is mounted on a side of the door D disposed at a side outward from the seat unit. The table panel 80 may be rotated by operation of the fourth driving unit M4. In the present configuration, the fourth driving unit may be a motor or may be implemented in other various ways that can rotate the table panel 80. When the table panel 80 is rotated and positioned over the seat cushion 30 or the leg cushion 40 by operation of the fourth driving unit M4, a passenger can put objects on the table panel 80. Furthermore, a passenger can take a more comfortable posture by putting arms on the table panel 80. As a result, there is an advantage in that riding comfort or convenience for a passenger may be increased.

As shown at the right side in FIG. 3, the table panel 80 is slid along the door D, so a passenger can move the table panel 80 to a desired position. That is, a passenger sitting in the seat can move the table panel 80 close to or far away from himself/herself.

As shown in FIGS. 1 to 9, the vehicle with a flat seat according to an exemplary embodiment of the present invention may further include a controller 500 that controls the fourth driving unit M4 to operate the table panel 80.

In the seat mode (S100), the controller can control the fourth driving unit M4 such that the table panel 80 is deployed over the seat cushion 30 or the leg cushion 40. Accordingly, in the seat mode, the controller 500 makes the table panel 80 be positioned over the seat cushion 30 or the leg cushion 40 by controller the fourth driving unit M4 (S160). Therefore, a passenger sitting in the seat can use the table panel 80.

In the sleep mode (S200), the controller can control the fourth driving unit M4 such that the table panel 80 is not positioned over the seat cushion 30 or the leg cushion 40. Accordingly, in the seat mode, the controller 500 makes the table panel 80 be inserted into the door D of the vehicle without being positioned over the seat cushion 30 or the leg cushion 40 by controller the fourth driving unit M4 (S250). Therefore, when a passenger lies, the passenger is not interfered with the table panel 80, so that the passenger can lie in more comfortable posture.

FIG. 5 is a view showing the state when a high-voltage battery B is connected to the seat cushion 30 according to an exemplary embodiment of the present invention. A high-voltage battery B may be disposed under the floor portion 10 of the vehicle with a flat seat according to an exemplary embodiment of the present invention, as shown in FIG. 4. Furthermore, as shown in FIG. 5, the seat cushion 30 may be connected to the high-voltage battery B through a heat transfer unit 90. Accordingly, heat which is generated when the high-voltage battery B is used can transfer to the seat cushion 30 through the heat transfer unit 90. Accordingly, by use of the waste heat from the high-voltage battery B, it is possible to heat the seat cushion 30, so more pleasant temperature may be provided to a passenger in wintertime, etc.

In more detail, the heat transfer unit 90 may be a heat pipe. Accordingly, for the heat transfer characteristic of the heat pipe, heat can transfer to the seat cushion 30 from the high-voltage battery B disposed under the seat cushion 30.

FIG. 4 is a view showing a second storage space G2 according to an exemplary embodiment of the present invention. A second storage space G2 disposed under the seat cushion 30 and recessed from a side of the floor portion to the inside of the interior of the vehicle may be formed in the floor portion 10 of the vehicle with a flat seat according to an exemplary embodiment of the present invention. The second storage space G2 may be open when the door D of the vehicle is open. The second storage space G2 may be closed when the door D of the vehicle is closed. Since the second storage space G2 is formed, as described above, it is possible to store objects such as a carrier in the second storage space G2, as shown in the figure. Accordingly, since it is possible to load objects such as a carrier in the vehicle, there is an advantage that it is possible to maximally use the space of the floor portion 10 at a side the leg groove H10. Furthermore, it may be possible to supply driving energy for the vehicle by inserting an additional high-voltage battery in the second storage space G2. In the instant case, a power connector may be disposed in the second storage space G2, so when an additional spare high-voltage battery is inserted, it is connected to the power connector, whereby driving energy may be supplied from the additional high-voltage battery to the vehicle with a flat seat.

FIG. 7 is a view showing a shoe panel 100 according to an exemplary embodiment of the present invention. The vehicle with a flat seat according to an exemplary embodiment of the present invention may further include a shoe panel 100 that has is disposed on a side of the floor portion 10, has a panel shape sliding into or out of the vehicle, and slides out of the vehicle when the door D is open and slides into the vehicle when the door D is closed. The shoe panel 10 is provided in an exemplary embodiment of the present invention. The shoe panel 100 has a panel shape sliding out of or into the vehicle. The shoe panel 100 can slide out of the vehicle when the door D is open. Accordingly, since the shoe panel 100 slides outside vehicle, a passenger can put shoes on the shoe panel 100. Furthermore, since the shoe panel 100 slides into the vehicle when the door D is closed, so shoes may be stored in the vehicle. Accordingly, a passenger can take off shoes when the passenger gets in the vehicle, and then can conveniently move in the interior.

According to the vehicle with a flat seat of the present invention, a flat space T may be formed such that a passenger can lie in the interior of the vehicle.

Since the flat space T has a complete horizontal plane, a passenger can conveniently move even in long-time driving.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle with a flat seat, the vehicle comprising:
   a floor portion having a leg groove recessed downward from a surface of the floor portion;
   a seatback disposed on the floor portion;
   a seat cushion disposed on the floor portion ahead of the seatback; and
   a leg cushion disposed in the leg groove of the floor portion, and configured for covering the leg groove to form a bottom of the flat seat with the seat cushion and the floor portion when unfolded, and opening the leg groove when stowed.

2. The vehicle of claim 1, wherein a rear portion of the leg cushion is rotatably coupled to the seat cushion.

3. The vehicle of claim 2, wherein when the leg cushion is rotated rearward thereof, the leg groove is open and when the leg cushion is rotated upward, the leg cushion forms the bottom with the seat cushion and the floor portion.

4. The vehicle of claim 1, further including:
   a sliding rail fixed to the floor portion,
   wherein the seatback is slidably engaged to the sliding rail to selectively move forward and rearward by operation of a first driving unit.

5. The vehicle of claim 4,
   wherein a rear portion of the leg cushion is rotatably coupled to the seat cushion, and
   wherein the leg cushion is rotated upward or downward by operation of a second driving unit.

6. The vehicle of claim 5, further including:
   a controller configured for controlling the first driving unit so that the seatback slides forward and rearward or controlling the second driving unit so that the leg cushion is rotated upward or downward.

7. The vehicle of claim 6,
   wherein, in a seat mode, the controller is configured to make the seatback slide forward and the leg cushion rotate downward by controlling the first driving unit and the second driving unit, and
   wherein, in a sleep mode, the controller is configured to make the seatback slide rearward and the leg cushion rotate upward by controlling the first driving unit and the second driving unit to form the flat seat.

8. The vehicle of claim 4,
   wherein a first storage space recessed under the sliding rail is formed in the floor portion, and
   wherein the vehicle further includes a cover panel slidably disposed over the first storage space to selectively open the first storage space by sliding of the cover panel.

9. The vehicle of claim 8, wherein the cover panel is covered with the seatback when the seatback slides forward and is exposed when the seatback slides rearward thereof.

10. The vehicle of claim 1, wherein a plurality of seat units is provided and disposed on the floor portion of the vehicle so that fronts of each pair of the seat units face each other.

11. The vehicle of claim 10, further including a separation panel formed in the floor portion between the plurality of seat units facing each other to separate a plurality of leg grooves.

12. The vehicle of claim 1, further including an armrest panel disposed at a side of the seat cushion on the floor portion, and forming a step higher than the seat cushion by operation of a third driving motor or forming the bottom with the seat cushion and the floor portion by operation of the third driving unit.

13. The vehicle of claim 1, further including a table panel having a panel shape, disposed on a side of a door disposed at a side of the vehicle outward a seat unit, and being deployed over the seat cushion or the leg cushion by rotating by operation of a fourth driving unit.

14. The vehicle of claim 13, further including:
   a controller configured for controlling the fourth driving unit to rotate the table panel,
   wherein the controller is configured to control the fourth driving unit so that the table panel is deployed over the seat cushion or the leg cushion in a seat mode, and to control the fourth driving unit so that the table panel is not deployed over the seat cushion or the leg cushion.

15. The vehicle of claim 1, wherein a battery is disposed under the floor portion and the seat cushion is connected to the battery through a heat transfer unit.

16. The vehicle of claim 1, wherein the heat transfer unit is a heat pipe.

17. The vehicle of claim 1, wherein a second storage space disposed under the seat cushion and recessed from a side of the floor portion to an interior of the vehicle is formed in the floor portion.

18. The vehicle of claim 1, further including a shoe panel disposed on a side of the floor portion, having a panel shape sliding into or out of the vehicle, and sliding out of the vehicle when a door of the vehicle is open and sliding into the vehicle when the door is closed.

* * * * *